US012638591B2

(12) United States Patent
Shroff et al.

(10) Patent No.: US 12,638,591 B2
(45) Date of Patent: May 26, 2026

(54) HAZARD DETECTION FOR MOBILE DEVICES

(71) Applicants: Aarsh Shroff, Redwood Shores, CA (US); Rajat Shroff, Redwood Shores, CA (US)

(72) Inventors: Aarsh Shroff, Redwood Shores, CA (US); Rajat Shroff, Redwood Shores, CA (US)

( * ) Notice: Subject to any disclaimer, the term of this patent is extended or adjusted under 35 U.S.C. 154(b) by 1032 days.

(21) Appl. No.: 17/827,912

(22) Filed: May 30, 2022

(65) Prior Publication Data

US 2023/0384457 A1 Nov. 30, 2023

(51) Int. Cl.
| | |
|---|---|
| *G01S 17/93* | (2020.01) |
| *G01S 7/481* | (2006.01) |
| *G06F 1/20* | (2006.01) |
| *G08B 7/06* | (2006.01) |
| *G08B 21/02* | (2006.01) |
| *G08B 25/01* | (2006.01) |
| *H04W 4/38* | (2018.01) |
| *H04W 4/80* | (2018.01) |
| *H04W 4/90* | (2018.01) |

(52) U.S. Cl.
CPC ............ *G01S 17/93* (2013.01); *G01S 7/4813* (2013.01); *G06F 1/206* (2013.01); *G08B 7/06* (2013.01); *G08B 21/02* (2013.01); *G08B*

*25/016* (2013.01); *H04W 4/38* (2018.02); *H04W 4/80* (2018.02); *H04W 4/90* (2018.02)

(58) Field of Classification Search
None
See application file for complete search history.

(56) References Cited

U.S. PATENT DOCUMENTS

| | | | |
|---|---|---|---|
| 11,816,801 B1* | 11/2023 | Bhushan | H04L 63/0428 |
| 2019/0098190 A1* | 3/2019 | Hosoe | G06F 3/04847 |

* cited by examiner

*Primary Examiner* — John F Mortell
(74) *Attorney, Agent, or Firm* — Wei IP Law, PC

(57) ABSTRACT

Techniques are provided for a hazard detection device for use with a mobile device. The hazard detection device includes a body configured to detachably couple with the mobile device, a remote sensing system comprising one or more sensors disposed on an exterior surface of the body and positioned such that the one or more sensors face away from a user using the mobile device when the body is coupled with the mobile device, a wireless communication component configured to communicate with the mobile device, a battery configured to power the remote sensing system and the wireless communication component, and a control module configured to receive an activation signal from the mobile device, activate the remote sensing system to collect remote sensing data from the one or more sensors of the remote sensing system in response to the activation signal, and transmit the remote sensing data to the mobile device.

19 Claims, 6 Drawing Sheets

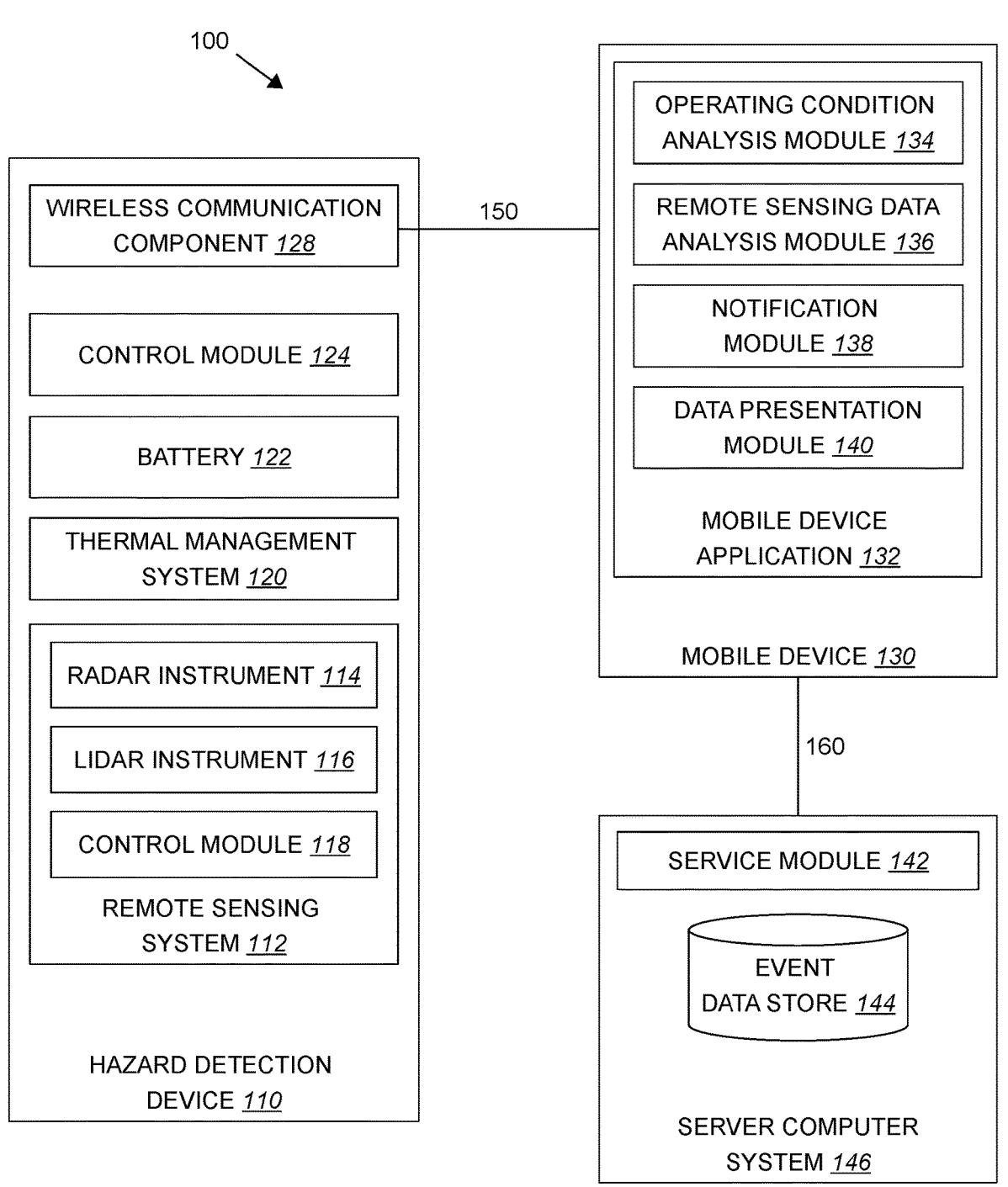

100

150

160

WIRELESS COMMUNICATION COMPONENT *128*

CONTROL MODULE *124*

BATTERY *122*

THERMAL MANAGEMENT SYSTEM *120*

RADAR INSTRUMENT *114*

LIDAR INSTRUMENT *116*

CONTROL MODULE *118*

REMOTE SENSING SYSTEM *112*

HAZARD DETECTION DEVICE *110*

OPERATING CONDITION ANALYSIS MODULE *134*

REMOTE SENSING DATA ANALYSIS MODULE *136*

NOTIFICATION MODULE *138*

DATA PRESENTATION MODULE *140*

MOBILE DEVICE APPLICATION *132*

MOBILE DEVICE *130*

SERVICE MODULE *142*

EVENT DATA STORE *144*

SERVER COMPUTER SYSTEM *146*

*FIG. 1*

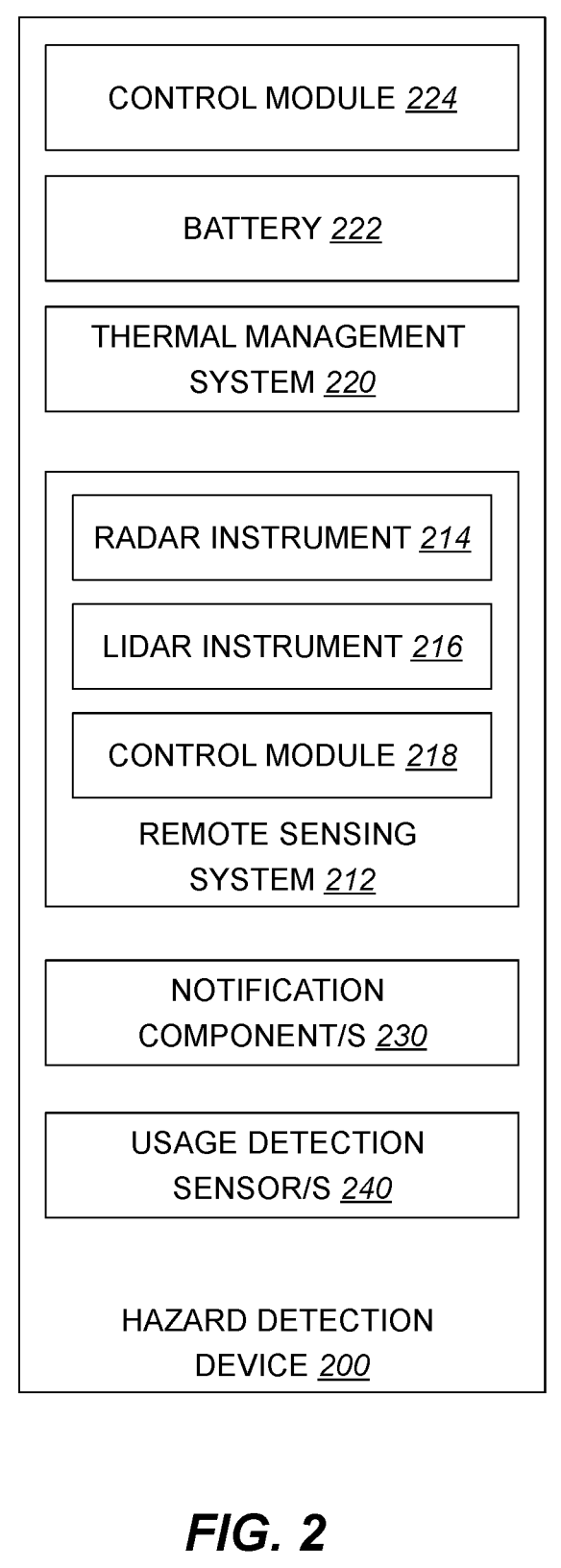

CONTROL MODULE *224*

BATTERY *222*

THERMAL MANAGEMENT
SYSTEM *220*

RADAR INSTRUMENT *214*

LIDAR INSTRUMENT *216*

CONTROL MODULE *218*

REMOTE SENSING
SYSTEM *212*

NOTIFICATION
COMPONENT/S *230*

USAGE DETECTION
SENSOR/S *240*

HAZARD DETECTION
DEVICE *200*

*FIG. 2*

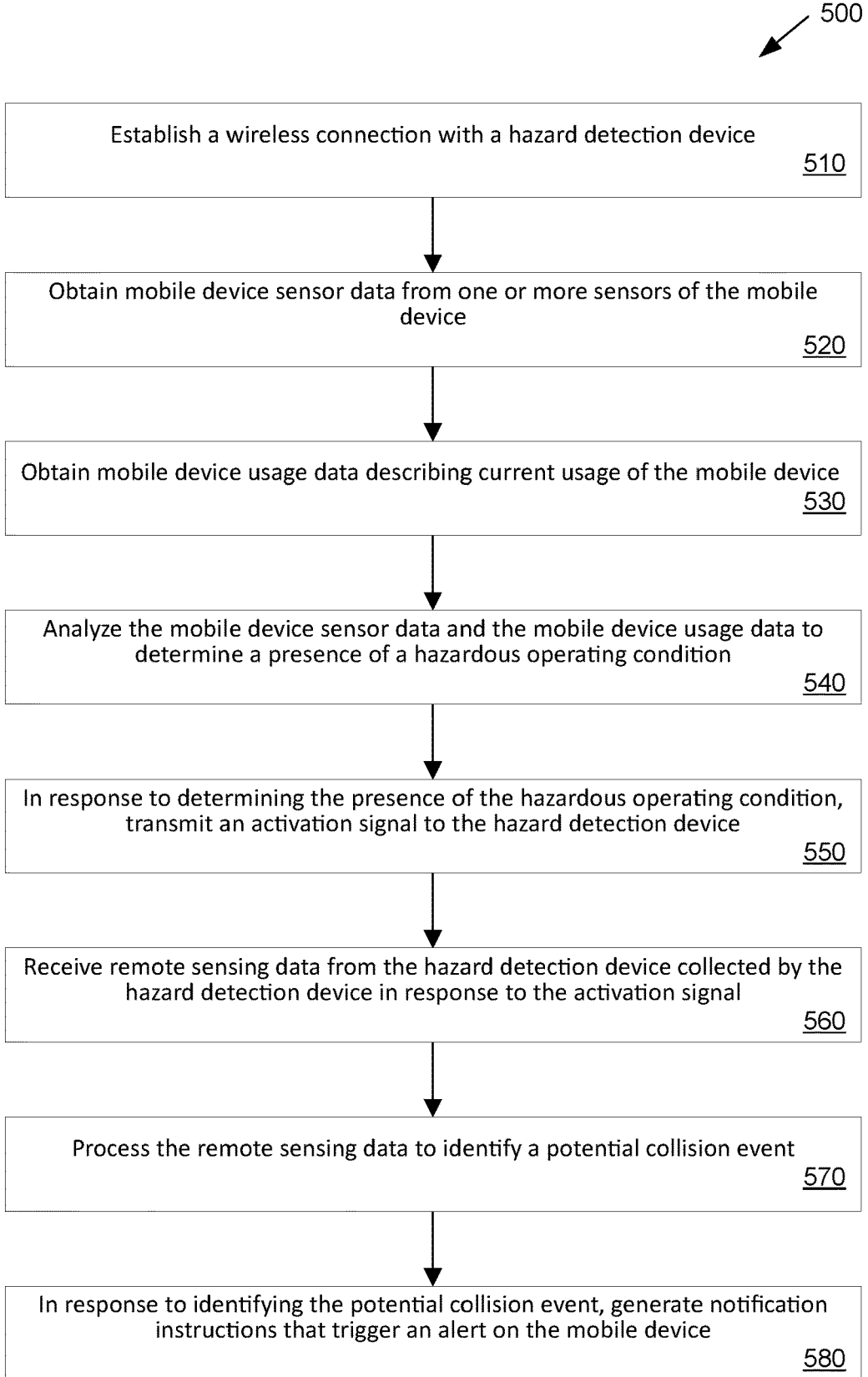

500

Establish a wireless connection with a hazard detection device
510

Obtain mobile device sensor data from one or more sensors of the mobile device
520

Obtain mobile device usage data describing current usage of the mobile device
530

Analyze the mobile device sensor data and the mobile device usage data to determine a presence of a hazardous operating condition
540

In response to determining the presence of the hazardous operating condition, transmit an activation signal to the hazard detection device
550

Receive remote sensing data from the hazard detection device collected by the hazard detection device in response to the activation signal
560

Process the remote sensing data to identify a potential collision event
570

In response to identifying the potential collision event, generate notification instructions that trigger an alert on the mobile device
580

*FIG. 5*

HAZARD DETECTION FOR MOBILE DEVICES

FIELD OF THE DISCLOSURE

The present disclosure generally relates to remote sensing systems, and relates more specifically to systems, methods, and apparatuses for monitoring, detection, and notification of hazardous conditions during usage of a mobile device.

BACKGROUND

Mobile device usage has become a pervasive aspect of everyday behavior. Such usage may include texting, other forms of communication, social media, business, media consumption, entertainment, and other purposes. Distraction caused by mobile device usage reduces attentiveness and increases the response time of the user, potentially resulting in injury and death. Legal restrictions have been imposed on drivers to prohibit the usage of mobile devices while driving. Technical restrictions have also been implemented to limit the usage of a mobile device while a user is operating a vehicle.

Mobile device usage is also problematic in other circumstances. For example, mobile device usage is known to affect pedestrians. Injuries and deaths have been observed when pedestrians navigate urban environments while using their mobile devices. In particular, mobile device usage increases a risk of collisions with motorized and non-motorized vehicles, other pedestrians, and/or objects.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary.

BRIEF DESCRIPTION OF THE DRAWINGS

In the drawings:

FIG. 1 illustrates a computer system that includes an example hazard detection device in accordance with one or more embodiments;

FIG. 2 illustrates an example hazard detection device that operates independently from a mobile device in accordance with one or more embodiments;

FIG. 5 is a flow diagram of a process for hazard detection for mobile devices in accordance with one or more embodiments.

Figure 3:
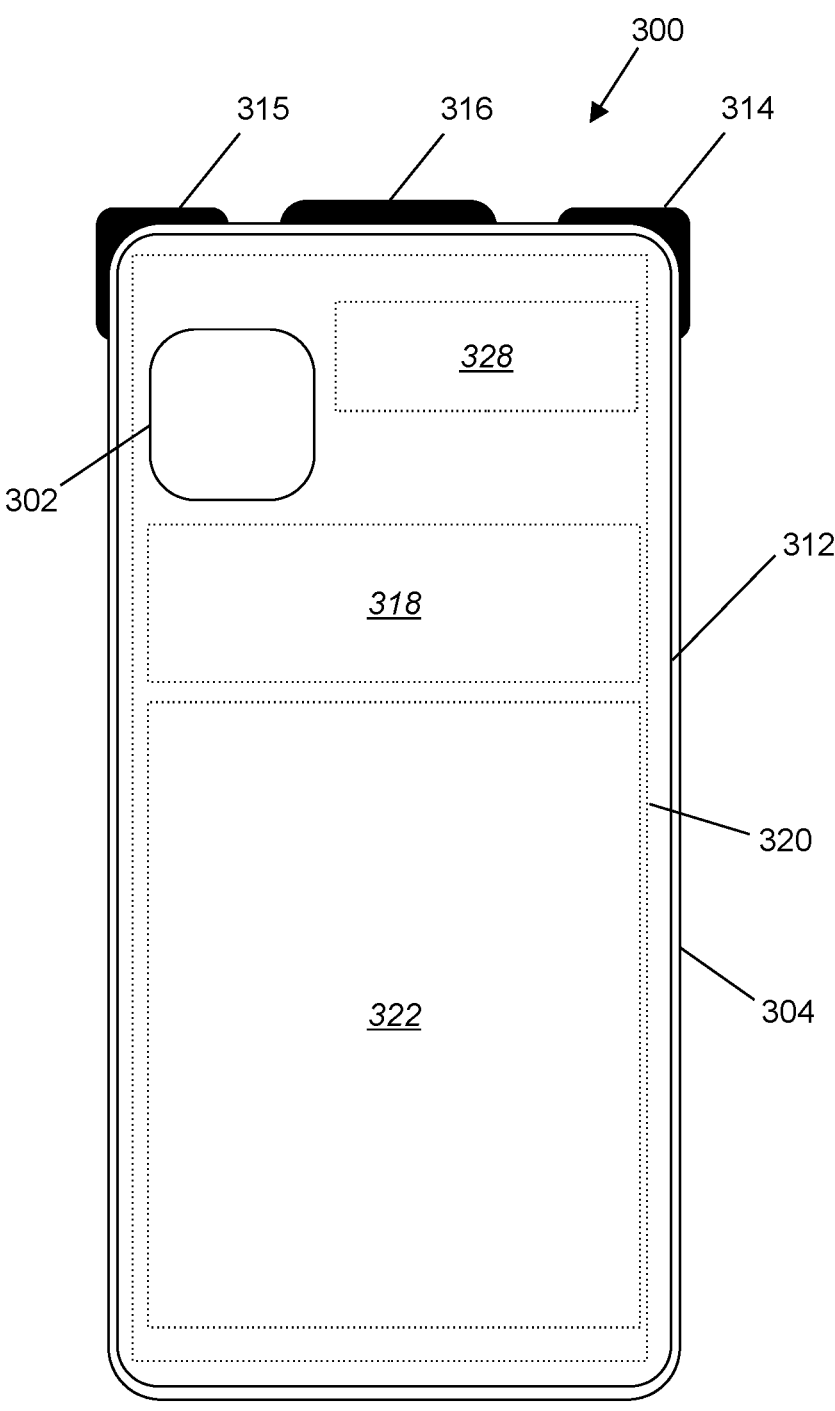
FIG. 3 illustrates a front view of an example hazard detection device comprising a mobile device case in accordance with one or more embodiments.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures.

However, using the particular arrangement illustrated in the one or more other figures is not required in other embodiments.

DETAILED DESCRIPTION

In the following description, numerous specific details are set forth in order to provide a thorough understanding of the present invention. It will be apparent, however, that the present invention may be practiced without these specific details. The detailed description that follows describes exemplary embodiments and the features disclosed are not intended to be limited to the expressly disclosed combination(s). Therefore, unless otherwise noted, features disclosed herein may be combined to form additional combinations that were not otherwise shown for purposes of brevity.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other, and does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

A "device" may be a computer system, hardware, and/or software stored in, or coupled to, a memory and/or one or more processors on one or more computers. As an addition or alternative, a device may comprise specialized circuitry. For example, a device may be hardwired or persistently programmed to support a set of instructions to perform the functions discussed herein. A device may be a standalone component, work in conjunction with one or more other devices, contain one or more other devices, and/or belong to one or more other devices.

A "module" may be hardware, and/or software stored in, or coupled to, a memory and/or one or more processors on one or more computers. As an addition or alternative, a module may comprise specialized circuitry, such as but not limited to one or more integrated circuits. For example, a module may be hardwired and/or persistently programmed with a set of instructions to perform the functions discussed herein. A module may be a standalone module, work in conjunction with one or more other modules, contain one or more other modules, and/or belong to one or more other modules.

A "computer system" refers to one or more computers, such as one or more physical computers, virtual computers, and/or computing devices. For example, a computer system may be, or may include, one or more server computers, desktop computers, laptop computers, mobile devices, special-purpose computing devices with a processor, cloud-based computers, cloud-based cluster of computers, virtual machine instances, and/or other computing devices. A computer system may include another computer system, and a computing device may belong to two or more computer systems. Any reference to a "computer system" may mean one or more computers, unless expressly stated otherwise. When a computer system performs an action, the action is performed by one or more computers of the computer system.

A "server" refers to a combination of integrated software components and an allocation of computational resources, such as memory, a computing device, and/or processes on the computing device for executing the integrated software components. The combination of the software and computational resources provide a particular type of function on behalf of clients of the server. A server may refer to either the combination of components on one or more computing devices, or the one or more computing devices (also referred to as "server system"). A server system may include multiple servers; that is, a server system may include a first computing device and a second computing device, which may provide the same or different functionality to the same or different set of clients.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage objects, such as CD or DVD objects, flash memory (such as carried on smartphones, multifunctional devices and/or tablets), and magnetic memory. Computers, terminals, network-enabled devices (e.g., mobile devices, such as cell phones) are all examples of machines and devices that utilize processors, memory, and instructions stored on computer-readable mediums. Additionally, embodiments may be implemented in the form of computer-programs, or a computer-usable carrier medium capable of carrying such a program.

General Overview

This document generally describes systems, methods, devices, and other techniques for hazard detection for mobile devices. Hazard detection techniques described herein alert a user of a mobile device of potential collision events when the user is using the mobile device. For example, a hazard detection device may include a remote sensing system that scans the environment to collect remote sensing data during mobile device usage. The remote sensing data is processed to detect a potential collision event. When a potential collision event is detected, an alert is triggered to notify the user.

One or more embodiments are directed to a hazard detection device for use with a mobile device. The hazard detection device includes a body configured to detachably couple with the mobile device. For example, the hazard detection device may comprise a mobile device case. In some embodiments, the body comprises a molded body comprising a cavity within the molded body. The cavity is sized to receive the mobile device and securely hold the mobile device when the mobile device is fully inserted into the cavity. In some embodiments, the one or more sensors of the hazard detection device are disposed near a top edge of the molded body and facing away from the user of the mobile device when the mobile device is fully inserted into the cavity.

As an addition or alternative, the hazard detection may comprise a mobile device attachment. For example, the hazard detection device may include a first clamp component coupled with and extending from the body in a first direction, and a second clamp component coupled with and extending from the body in a second direction. The first clamp component includes a first contact surface. The second clamp component includes a second contact surface that faces the first contact surface. The first clamp component and the second clamp component are adjustable to receive and securely hold the mobile device between the first contact surface and the second contact surface.

The hazard detection device further includes a remote sensing system comprising one or more sensors disposed on an exterior surface of the body. The one or more sensors are positioned such that the one or more sensors face away from a user of the mobile device when the body is coupled with the mobile device. In some embodiments, the remote sensing system includes a solid-state Light Detection and Ranging (LIDAR) instrument, and the one or more sensors disposed on the exterior surface of the body includes a LIDAR camera. In some embodiments, the remote sensing system includes a radio direction and ranging (radar) instrument, and the one or more sensors disposed on the exterior surface of the body include a radar sensor. In some embodiments, the remote sensing system includes a combined LIDAR and radar chip that includes one or more integrated circuits that control a LIDAR instrument and a radar instrument.

The hazard detection device further includes a wireless communication component configured to communicate with the mobile device. The hazard detection device further includes a battery configured to power the remote sensing system and the wireless communication component. In some embodiments, the hazard detection device includes a liquid cooling system configured to perform thermal management for at least one of the battery and the remote sensing system when the remote sensing system is activated.

The hazard detection device further includes a control module configured to receive an activation signal from the mobile device, activate the remote sensing system to collect remote sensing data from the one or more sensors of the remote sensing system in response to the activation signal, and transmit the remote sensing data to the mobile device. In some embodiments, the hazard detection device receives the activation signal from an application executing on the mobile device.

In some embodiments, an application executing on the mobile device is configured to analyze mobile device sensor data and mobile device usage data describing current usage of the mobile device to determine a presence of a hazardous operating condition. A hazardous operating condition includes usage of the mobile device in a manner that causes an elevated risk of distraction and/or collision. The mobile device application transmits the activation signal to the wireless communication component of the hazard detection device in response to determining the presence of the hazardous operating condition.

In some embodiments, the one or more sensors of the one or more remote sensing system are movably coupled with the body to adjust a position of the one or more sensors relative to the mobile device when the mobile device is coupled with the body. For example, the one or more sensors may be disposed on a movable panel that is movably coupled with the body to adjust the position of the one or more sensors.

One or more embodiments are directed to a computer-implemented method for hazard detection on a mobile device. A wireless connection is established with a hazard detection device. In some embodiments, the hazard detection device is a wearable device worn by the user of the mobile device. As an addition or alternative, the hazard detection device may be a mobile device case. As an addition or alternative, the hazard detection device may be a mobile device attachment. Mobile device sensor data is obtained from one or more sensors of the mobile device. Mobile device usage data is obtained, the mobile device usage data describing current usage of the mobile device by a user of the mobile device, The mobile device sensor data and the mobile device usage data are analyzed to determine a presence of a hazardous operating condition. In response to determining the presence of the hazardous operating condition, an activation signal is transmitted to the hazard detection device. Remote sensing data is received from the hazard detection device collected by the hazard detection device in response to the activation signal. In some embodiments, the remote sensing data received from the hazard detection device includes LIDAR data. As an alternative or addition, the remote sensing data received from the hazard detection device may include radar data. The remote sensing data is processed to identify a potential collision event. In response to identifying the potential collision event, notification instructions are generated. The notification instructions trigger an alert on the mobile device.

In some embodiments, the computer-implemented method includes sending hazard analysis data associated with the mobile device and the potential collision event to a server computer system, receiving analytical data generated by the server computer system based on a plurality of potential collision events associated with the mobile device, and presenting the analytical data on a display of the mobile device. The analytical data may describe potentially hazardous behavior by the user of the mobile device.

In some embodiments, the computer-implemented method includes sending hazard analysis data associated with the mobile device and the potential collision event to a server computer system, receiving aggregate data generated by the server computer system based on a plurality of potential collision events associated with a plurality of mobile devices, and presenting the aggregate data on a display of the mobile device. The aggregate data may describe potentially hazardous conditions associated with a location of the mobile device.

In some implementations, the various techniques described herein may achieve one or more of the following advantages: accidents involving the usage of mobile devices are potentially reduced; usage reports and statistics may educate users about potential unsafe situations; analytic data may provide behavior data and education to potentially change long-term user behavior with regards to the safe usage of mobile devices; aggregate data may help identify locations and/or situations associated with increased user risk; systems for hazard detection may be integrated with mobile devices in a user-friendly manner; hazard detection device thermal management is optimized; and/or hazard detection device battery usage is optimized. Additional features and advantages are apparent from the specification and the drawings.

System Overview

FIG. 1 illustrates a computer system that includes an example hazard detection device in accordance with one or more embodiments. The computer system 100 includes a hazard detection device 110, a mobile device 130, and a server computer system 146. The hazard detection device 110 is configured to removably couple with the mobile device 130. In some embodiments, the hazard detection device 110 is a mobile device case. As an addition or alternative, the hazard detection device may be a mobile device attachment. As an addition or alternative, the hazard detection device may be a wearable device worn by the user of the mobile device 130. The mobile device 130 may include any handheld computing device, such as a cellular phone, smartphone, personal digital assistants (PDAs), tablet, or another handheld computing device.

The hazard detection device 110 includes a remote sensing system 112 comprising one or more sensors disposed on an exterior surface of the hazard detection device 110. The one or more sensors are positioned such that the one or more sensors face away from a user of the mobile device 130 when the hazard detection device 110 is coupled with the mobile device. A sensor of the remote sensing system 112 includes any device that collects remote sensing data. Remote sensing data includes data describing one or more objects in the environment in which the mobile device 130 is operated, where the data is acquired without making physical contact with the object/s. The one or more sensors of the remote sensing system 112 may include one or more LIDAR sensors, radar sensors, sonar sensors, microphones, cameras, or any other sensors that can acquire remote sensing data in the operating environment.

The remote sensing system 112 may include one or more remote sensing instruments. The remote sensing instruments may include one or more active remote sensing instruments. An active remote sensing instrument includes one or more energy sources that emit signals into the environment and one or more sensors that observe the interaction between the emitted signal and one or more objects in the environment. As an alternative or addition, the remote sensing instruments may include one or more passive remote sensing instruments. A passive remote sensing instrument includes one or more sensors that observe the interaction between one or more objects and energy sources that exist in the operating environment without emitting additional signals.

In some embodiments, the remote sensing system 112 includes a LIDAR instrument 116 comprising at least one laser energy source and at least one LIDAR sensor. The laser energy source emits laser pulse that bounce off objects in the environment and return to the LIDAR sensor. The LIDAR instrument 116 generates remote sensing data describing the environment based on the time that it takes the laser pulse to travel from the laser energy source, bounce off one or more objects in the environment, and return to the LIDAR sensor.

For example, the LIDAR instrument 116 may include a mechanical LIDAR instrument comprising a LIDAR scanner or a solid-state LIDAR instrument with a LIDAR camera with no or limited mechanical moving parts. In some embodiments, the LIDAR instrument 116 is a solid-state LIDAR instrument comprising a LIDAR camera. The LIDAR camera may be disposed on an exterior surface of the body of the hazard detection device 110.

In some embodiments, the LIDAR instrument 116 collects remote sensing data by emitting a large-area laser pulse to illuminate the environment in front of the mobile device 130 and capturing an image of the environment, thereby reducing distortions caused by movement and/or vibration at the mobile device 130 and/or the hazard detection device 110. In some embodiments, the large-area laser pulse is generated by firing a plurality of lasers in multiple directions, generating a plurality of images, and processing the plurality of images to generate a 3D model of the environment. The LIDAR instrument 116 can be used to determine the speed, direction, size, and depth of a plurality of objects in the environment.

In some embodiments, the remote sensing system 112 includes a radar instrument 114 comprising at least one radio wave transmitter and at least one radar sensor comprising a radio wave receiver. The radio wave transmitter and the radio wave receiver may be different devices or the same device, such as an antenna that both transmits and receives radio waves. The radar sensor may be disposed on an exterior surface of the body of the hazard detection device 110. The radar instrument 114 generates remote sensing data describing the environment based on the time it takes the radio waves to travel to the radio wave transmitter, bounce off one or more objects in the environment, and return to the radar sensor. For example, the radio wave transmitter may emit radio waves in a narrow pulse that is suitable for determining the location and speed of an object in the environment.

The remote sensing system 112 may include a control module 118 configured to control one or more remote sensing instruments, such as a LIDAR instrument 116 and/or a radar instrument 114. As an alternative or addition, the control module 118 may be configured to process remote sensing data generated by one or more remote sensing instruments. For example, the control module 118 may generate processed remote sensing data describing the environment based on raw remote sensing data directly obtained from the one or more remote sensing instruments. While the control module 118 of the remote sensing system 112 is conceptually illustrated as a distinct component, elements of the control module 118 may be implemented by one or more of the remote sensing instruments (e.g., LIDAR instrument 116, radar instrument 114) of the remote sensing system 112.

In some embodiments, the control module 118 selectively uses remote sensing instruments of the remote sensing system 112. For example, the control module 118 may selectively use the LIDAR instrument 116 and/or the radar instrument 114 based on one or more factors, such as a battery level of the hazard detection device 110 and/or environmental conditions, such as weather conditions, lighting conditions, and/or other environmental conditions. In some embodiments, the control module 118 uses the LIDAR instrument 116 as a primary remote sensing data source and the radar instrument 114 as a secondary remote sensing data source. For example, the control module 118 may use the radar instrument 114 as a secondary remote sensing data source when environmental conditions are not optimal for the operation of the LIDAR instrument 116, when limited battery power is available, and/or when other factors are present. In some embodiments, the control module 118 tests the quality of raw remote sensing data collected by the LIDAR instrument 116 and generates processed remote sensing data comprising a 3D mapping of the environment when the quality of the remote sensing data collected by the LIDAR instrument 116 is sufficient. When the quality of the remote sensing data collected by the LIDAR instrument 116 is not sufficient, the control module 118 may activate the radar instrument 114 to collect remote sensing data from the radar instrument 114. In this case, the control module 118 may generate processed remote sensing data based on a combination of LIDAR data and radar data, or solely based on the radar data.

In some embodiments, the control module 118 includes a combined LIDAR and radar chip that includes one or more integrated circuits that selectively control the LIDAR instrument 116 and the radar instrument 114. The combined LIDAR and radar chip processes remote sensing data collected by each of the LIDAR instrument 116 and the radar instrument 114 generate an enhanced 3D model of the environment.

In some embodiments, the hazard detection device includes a battery 122. The battery 122 is configured to power electronic components of the hazard detection device 110, such as the remote sensing system 112, the control module 124, and/or the wireless communication component 128. As an alternative and/or addition, the battery 122 may be a solid-state rechargeable battery comprising a solid electrolyte. As an alternative or addition, the battery 122 has a liquid electrolyte, such as but not limited to one or more lithium-ion batteries. In some embodiments, the hazard detection device 110 includes one or more charging ports to couple the hazard detection device 110 to another power source for charging the battery 122 and/or operating the hazard detection device 110. In some embodiments, the hazard detection device 110 may couple with the mobile device 130 through a charging port to charge the battery 122 and/or operating the hazard detection device 110 using a battery of the mobile device 130.

In some embodiments, the hazard detection device includes a thermal management system 120 configured to perform heat management for one or more components of the hazard detection device 110, such as the remote sensing system 112 and/or its components, the battery 122, the control module 124, and/or any other component of the hazard detection device 110. In some embodiments, the thermal management system 120 includes a liquid cooling system. For example, the thermal management system 120 may include a liquid glycol cooling system.

In some embodiments, the hazard detection device 110 includes a wireless communication component 128. The wireless communication component 128 is configured to communicate with the mobile device 130. In some embodiments, a wireless communication channel 150 is established between the mobile device 130 and the wireless communication component 128 of the hazard detection device 110. The wireless communication component 128 may include a Bluetooth module, a Wi-Fi module, or another module capable of establishing a wireless communication channel 150 with the mobile device 130. In some embodiments, the hazard detection device 110 receives an activation signal from the mobile device 130 over the wireless communication channel 150. The activation signal indicates that the mobile device 130 has detected the presence of a hazardous operating condition, such as distracted walking. As an alternative or addition, the hazard detection device 110 may transmit remote sensing data, including processed remote sensing data and/or raw remote sensing data to the mobile device 130 over the wireless communication channel 150. As an alternative or addition, the hazard detection device 110 may transmit an alert regarding a detected potential collision event to the mobile device 130 over the wireless communication channel 150.

In some embodiments, the hazard detection device 110 includes a control module 124 configured to control one or more electronic components of the hazard detection device 110. For example, the control module 124 may send commands, receive data, and/or otherwise communicate with one or more components of the hazard detection device 110. In some embodiments, the control module 124 is configured to process an activation signal received from the mobile device 130 by the wireless communication component 128.

As an alternative or addition, the control module 124 may be configured to activate the remote sensing system 112 to collect remote sensing data in response to the activation signal. As an alternative or addition, the control module 124 may be configured to transmit the remote sensing data to the mobile device 130 over the wireless communication channel 150 using the wireless communication component 128. As an alternative or addition, the control module 124 may be configured to monitor and manage power usage and/or a battery level of the battery 122. As an alternative or addition, the control module 124 may be configured to control a thermal management system 120 for the hazard detection device 110. As an alternative or addition, the control module 124 may be configured to process remote sensing data generated by the remote sensing system 112 and/or its components. While the control module 118 of the remote sensing system 112 is conceptually illustrated as a distinct component from the control module 124, elements of the control module 124 and the control module 118 of the remote sensing system 112 may be distinct, partially integrated, or fully integrated into a single control module.

Mobile Device Application

In some embodiments, a mobile device application 132 executes on the mobile device 130. In some embodiments, the mobile device application 132 is a native application developed for a mobile platform of the mobile device 130, such as but not limited to the Android platform, the Windows Mobile platform, the iOS platform, and the like. As an alternative or addition, the mobile device application 132 executes in a web application executed in a web browser executing on the mobile device 130. The mobile device application 132 may establish a wireless communication channel 150 with the hazard detection device 110.

In some embodiments, the mobile device application 132 includes an operating condition analysis module 134. The operating condition analysis module 134 analyzes data generated at the mobile device 130 to determine the presence of a hazardous operating condition. A hazardous operating condition includes usage of the mobile device in a manner that causes an elevated risk of distraction and/or collision. For example, a hazardous operating condition may be present when a user is texting while walking.

In some embodiments, the operating condition analysis module 134 obtains mobile device sensor data from one or more sensors of the mobile device 130, such as but not limited to one or more of an accelerometer, a gyroscope, a GPS sensor, an ambient light sensor, a barometer, a camera, and/or any other sensor of the mobile device 130. The mobile device sensor data may indicate a type and/or degree of movement by the user and/or a location of the user.

As an alternative or addition, the operating condition analysis module 134 obtains mobile device usage data describing current usage of the mobile device 130 by a user of the mobile device 130. In some embodiments, the mobile device usage data describes the usage of particular applications on the mobile device 130, such a texting application, another messaging application, another communications communication, a browser application, a social media application, an audio and/or video media application, a gaming application, another entertainment application, and/or other another application executing on the mobile device 130. As an addition or alternative, the mobile device usage data may describe user interactions, such as tapping, scrolling, scrolling, swiping, panning, and/or other user interactions with the mobile device 130. As an addition or alternative, the mobile device usage data may describe one or more external devices connected to the mobile device 130, such as one or more audio devices, Bluetooth devices, and/or other external devices.

The operating condition analysis module 134 analyzes the mobile device sensor data and/or the mobile device usage data to determine the presence of a hazardous operating condition. For example, the operating condition analysis module 134 may determine the presence of a hazardous operating condition based on the usage of a texting application while the mobile device sensor data indicates that a user of the mobile device is likely walking. As another example, the operating condition analysis module 134 may determine the presence of a hazardous operating condition based on a high amount of user interaction with the mobile device 130 when the mobile device 130 is located in an urban environment.

In response to determining the presence of the hazardous operating condition, the operating condition analysis module 134 causes transmission of an activation signal to the hazard detection device 110. For example, the operating condition analysis module 134 may cause a communication component of the mobile device 130 to transmit the activation signal to the hazard detection device 110 over the wireless communication channel 150. The transmission of the activation signal causes the hazard detection device 110 to activate and start collecting remote sensing data.

In some embodiments, the mobile device application 132 includes a remote sensing data analysis module 136. The remote sensing data analysis module 136 processes remote sensing data received by the mobile device 130 from the hazard detection device 110, such as remote sensing data collected by the hazard detection device 110 in response to the activation signal. In some embodiments, the remote sensing data received by the mobile device 130 includes raw remote sensing data as collected by one or more remote sensing instruments (e.g., LIDAR instrument 116, radar instrument 114) and/or processed remote sensor data generated by a control module (e.g., control module 118, control module 124) of the hazard detection device 110. The remote sensing data analysis module 136 may perform additional processing on the received remote sensing data before performing collision detection analysis.

In some embodiments, the remote sensing data analysis module 136 analyzes the processed remote sensing data to identify potential collision events between the user of the mobile device 130 and one or more objects in the environment. For example, the remote sensing data analysis module 136 may analyze the remote sensing data to determine the size, velocity, and/or distance of one or more objects in front of the mobile device 130. A potential collision event may be identified or detected based on the probability that an object in the environment will come within a certain distance of the user. The detection of a potential collision event may be based on the object's location and/or movement relative to on the user's location and/or movement. In some embodiments, the remote sensing data analysis module 136 classifies one or more detected objects. For example, the remote sensing data analysis module 136 may determine a particular detected object is a moving object, a vehicle, a person, an animal, a stationary object, a post, a tree, and/or any other object classification.

In some embodiments, the mobile device application 132 includes a notification module 138. In response to identifying a potential collision event, the notification module 138 causes an alert to be delivered to the user via the mobile device 130 and/or the hazard detection device 110. In some embodiments, the notification module 138 generates instructions that trigger an alert system of the mobile device 130. For example, the alert system may be integrated in an operating system of the mobile device 130. In some embodiments, the alert system may deliver one or more of a vibration alert, an auditory alert, a visual alert, and/or another type of notification that alerts the user to the detected potential collision event.

In some embodiments, the mobile device application 132 includes a data presentation module 140. The data presentation module 140 displays hazard detection information and/or behavior analysis to a user of the mobile device 130. For example, the data presentation module 140 may present information describing one or more potential collision events on a display of the mobile device 130.

In some embodiments, the data presentation module 140 presents analytical data describing potentially hazardous behavior by the user of the mobile device 130 based on historical remote sensing data generated by the hazard detection device 110, such as but not limited to historical collision event data and/or other behavior data generated based on historical remote sensing data from the mobile device 130 and/or hazard detection device 110 associated with the user. In some embodiments, the analytical data corresponding to the user is generated by a server computer system 146 based on a plurality of potential collision events associated with the mobile device 130 and/or the corresponding hazard detection device 110.

In some embodiments, the data presentation module 140 renders a map interface on a display of the mobile device 130. The map interface may include a path of the user comprising data collected by the mobile device 130 and/or the hazard detection device 110 while the hazard detection device 110 was in operation, such as when the hazard detection device 110 was collect remote sensing data in response to an activation signal. For example, the mobile device application 132 may collect GPS data when the hazard detection device 110 is activated, allowing the data presentation module 140 to generate and render the path of the user on the map interface. The data presentation module 140 may render historical collision event data and/or other behavior data on the map interface in association with the user's path, thereby providing the user a visual representation of the risk profile for the user during a time period when the hazard detection device 110 was activated.

In some embodiments, the data presentation module 140 presents aggregate data generated by a server computer system 146 based on a plurality of potential collision events associated with a plurality of mobile devices and/or hazard detection devices. For example, the aggregate data may describe potentially hazardous conditions associated with a current location of the mobile device 130. In some embodiments, the aggregate data is generated by a server computer system 146 based on a plurality of potential collision events associated with a plurality of mobile devices and/or a plurality of hazard detection devices. In some embodiments, aggregate data received from the server computer system 146 is used by the operating condition analysis module 134 to determine the presence of a hazardous operating condition. As an addition or alternative, the aggregate data received from the server computer system 146 may be used by the remote sensing data analysis module 136 to identify a potential collision event.

While one or more modules (e.g., operating condition analysis module 134, remote sensing data analysis module 136, notification module 138, data presentation module 140) of the mobile device application 132 are separately illustrated, one or more modules of the mobile device application

132 may be distinct, partially integrated, or fully integrated. Furthermore, one or more modules may share one or more processes. Any function described with respect to one or more modules is a function of the mobile device application 132 and is performed by the mobile device 130 when the mobile device application 132 executes on the mobile device 130.

In some embodiments, the computer system 100 includes a server computer system 146. The mobile device application 132 may submit data associated with detected potential collision events to the server computer system 146. Data associated with a particular detected potential collision event may be associated with the corresponding user, mobile device 130, hazard detection device 110, and/or location.

The mobile device application 132 and the server computer system 146 may communicate over a network 160. The network 160 may include one or more cellular networks, wireless networks, local area networks (LANs), and/or one or more wide area networks, such as the Internet. In some embodiments, the mobile device application 132 interacts with a service module 142 of the server computer system 146. The server computer system may store data received from a plurality of mobile devices 130, such as data associated with a plurality of potential collision events, in an event data store 144.

Standalone Hazard Detection Device

FIG. 2 illustrates an example hazard detection device that operates independently from a mobile device in accordance with one or more embodiments. The hazard detection device 200 includes a remote sensing system 212, such as but not limited to a remote sensing system comprising a LIDAR instrument 216, a radar instrument 214, and a control module 218. The hazard detection device 200 includes a battery 222 to power the hazard detection device 200. In some embodiments, the hazard detection device 200 includes a thermal management system 220 configured to perform heat management for one or more components of the hazard detection device 200. In some embodiments, the hazard detection device 200 includes a control module 224 configured to control one or more electronic components of the hazard detection device 200.

In some embodiments, the hazard detection device 200 includes one or more usage detection sensor/s 240. The usage detection sensor/s 240 may include one or more of an accelerometer, a gyroscope, a GPS sensor, an ambient light sensor, a barometer, a camera, and/or any other sensor. The control module 224 may be configured to analyze sensor data collected from the user detection sensor/s 240 to determine the presence of a hazardous operating condition. In some embodiments, when the control module 224 detects the presence of a hazardous operating condition, the control module 224 activates the remote sensing system 212 to start collecting remote sensing data.

In some embodiments, the hazard detection device 200 includes one or more notification component/s 230. The notification component/s 230 may include one or more alert mechanisms, such as a vibration mechanism, an auditory mechanism, a visual mechanism, and/or another mechanism that alerts the user to the detected potential collision event.

Example Mobile Device Case

FIG. 3 illustrates a front view of an example hazard detection device comprising a mobile device case in accordance with one or more embodiments. In some embodiments, a hazard detection device (e.g., hazard detection device 110, 200) is implemented as a mobile device case 300. The mobile device case 300 includes a body 304. The body 304 may be formed using one or more manufacturing techniques, such as but not limited to die casting, forming, stamping, machining, injection molding, and/or other manufacturing processes. In some embodiments, the body 304 is formed from a polymer material, such as plastic, silicone, and/or another polymer material.

In some embodiments, the mobile device case 300 includes a cavity 312 within the body 304. The cavity 312 is sized to receive the mobile device (e.g., mobile device 130) and securely hold the mobile device when the mobile device is fully inserted into the cavity 312 of the mobile device case 300. The mobile device case 300 may include one or more cutouts 302 configured to expose one or more rear-facing mobile device sensors such that they are not occluded by the body 304. For example, the mobile device case 300 may include one or more cutouts 302 for a mobile device camera, a fingerprint reader, and/or other rear-facing sensors of the mobile device.

In some embodiments, the mobile device case 300 includes one or more components of a hazard detection device, such as but not limited to a wireless communication component 328, a control module 318 of a remote sensing system (e.g., remote sensing system 112), a battery 322, and/or a thermal management system 320. In some embodiments, the one or more components are embedded in the body 304. As an alternative or addition, the one or more components may be exposed. As an alternative or addition, the one or more components may be disposed in a covered compartment within the body 304.

In some embodiments, the mobile device case 300 includes one or more remote sensing components 314-316 of the remote sensing system. The one or more remote sensing components 314-316 face toward the rear of the mobile device case 300. In some embodiments, the one or more remote sensing components 314-316 include a radar antenna 315, a LIDAR camera 316, and LIDAR laser 314. In some embodiments, the one or more remote sensing components 314-316 are disposed near a top edge of the body 304 such that the one or more remote sensing components 314-316 face away from the user of the mobile device when the mobile device is fully inserted into the cavity.

Example Mobile Device Attachment

Figure 4A:
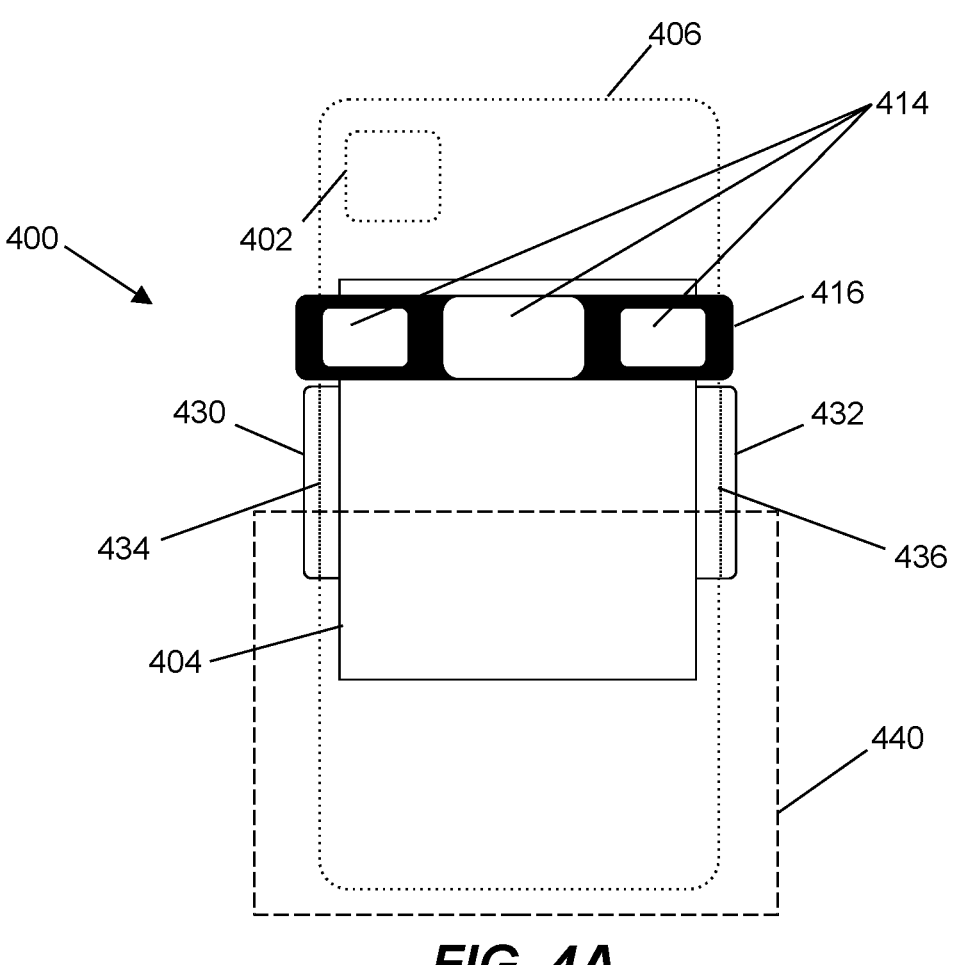
FIGS. 4A-4B illustrate an example hazard detection device comprising a clamping mechanism and a movable panel in accordance with one or more embodiments.
Figure 4B:
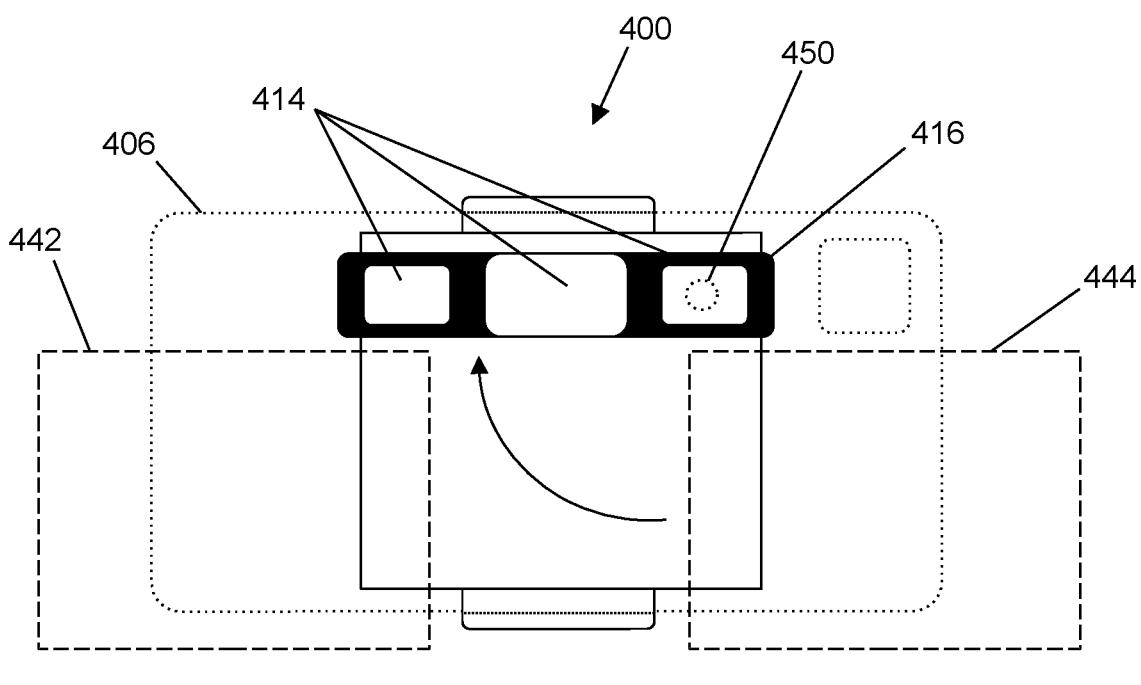

FIGS. 4A-4B illustrate an example hazard detection device comprising a clamping mechanism and a movable panel in accordance with one or more embodiments. In some embodiments, a hazard detection device (e.g., hazard detection device 110, 200) is implemented as a mobile device attachment 400 that detachably couples with a mobile device 406. FIG. 4A is a rear view of a mobile device 406 in a portrait orientation when the mobile device attachment 400 is coupled with the mobile device 406. FIG. 4B is a rear view of the mobile device 406 in a landscape orientation when the mobile device attachment 400 is coupled with the mobile device 406.

The mobile device attachment 400 includes a first clamp component 430 coupled with and extending from a body 404 of the mobile device attachment 400 in a first direction. The mobile device attachment 400 includes a second clamp component 432 coupled with and extending from the body 404 of the mobile device attachment 400 in a second direction.

The first clamp component 430 includes a first contact surface 434. The second clamp component 432 includes a second contact surface 436 that faces the first contact surface 434. The first clamp component 430 and the second clamp component 432 are adjustable to receive and securely hold the mobile device 406 between the first contact surface 434 and the second contact surface 436. For example, the first clamp component 430 and the second clamp component 432 may include one or more adjustment mechanisms, such as one or more springs, screws, or the like.

In some embodiments, the first contact surface 434 and the second contact surface 436 comprise a material to increase the friction between the contact surfaces 434-436 and the mobile device 406, such as foam, silicone, rubber, or any other material that improves a grip between the contact surfaces 434-436 and corresponding surfaces of the mobile device 406.

A user can adjust a position of the mobile device 406 between the first clamp component 430 and the second clamp component 432 such that the mobile device attachment 400 does not occlude the mobile device hardware 402 disposed on the rear surface of the mobile device 406. Mobile device hardware 402 disposed on the rear surface of the mobile device 406 may include a mobile device camera, a mobile device fingerprint reader, and/or any other hardware disposed on the rear surface of the mobile device 406.

Example Movable Panel

In some embodiments, one or more sensors of one or more remote sensing instruments (e.g., radar instrument 114, radar instrument 214, LIDAR instrument 116, LIDAR instrument 216) are movably coupled with a body of the hazard detection device (e.g., hazard detection device 110, hazard detection device 200, mobile device case 300, mobile device attachment 400) to adjust the position of the one or more sensors relative to the mobile device when the mobile device is coupled with the body of the hazard detection device. When a user is using a mobile device, the user's hand placement may affect the operation of the one or more sensors and/or emitters, such as by occluding the one or more sensors and/or emitters. The adjustment of the position of the one or more sensors and/or emitters allows for the operation of the one or more sensors and/or emitters without interference by the user's hand placement.

FIGS. 4A-4B illustrates an example mechanism for adjusting the position of one or more sensors 414 to allow for the operation of the one or more sensors 414 without interference by the user's hands when the mobile device 406 is used in different orientations. While FIGS. 4A-4B illustrate an example mechanism on a mobile device attachment 400, the mechanism may be implemented with other implementations of the hazard detection device (e.g., hazard detection device 110, hazard detection device 200, mobile device case 300). Furthermore, other mechanisms for adjusting the position of the one or more sensors 414, such as rails, pins, slides, and the like, are within the scope of this disclosure.

In some embodiments, the one or more sensors 414 are disposed on a movable panel 416. The movable panel 416 is movably coupled with the body to adjust the position of the one or more sensors 414. In some embodiments, a pivot mechanism 450 allows the movable panel 416 to pivot between a first position shown in FIG. 4A and a second position shown in FIG. 4B. The one or more sensors 414 remain electronically connected to hardware housed within the body 404 of the mobile device attachment 400 through the pivot mechanism 450. For example, the sensors 414 remain powered by a battery (e.g., battery 122, 222) of the mobile device attachment 400 and remain in electronic communication with one or more control components (e.g., control module 118, 124, 218, 224) of the mobile device attachment 400.

FIG. 4A shows the movable panel 416 in a first position when the mobile device 406 in used in a portrait orientation by a user. Hand placement region 440 shows the typical contact made by a user with the rear of a mobile device 406 when using the mobile device 406 in the portrait orientation. The one or more sensors 414 of the remote sensing system are positioned outside of the hand placement region 440 when the movable panel 416 is in the first position.

FIG. 4B shows the movable panel 416 in a second position when the mobile device 406 in used in a landscape orientation by a user. Hand placement regions 442-444 show the typical contact made by a user with the rear of a mobile device 406 when using the mobile device 406 in the landscape orientation. The one or more sensors 414 of the remote sensing system are positioned outside of the hand placement regions 442-444 when the movable panel 416 is in the second position.

Example Processes

FIG. 5 is a flow diagram of a process for hazard detection for mobile devices in accordance with one or more embodiments. Process 500 may be performed by one or more computing devices and/or processes thereof. For example, one or more blocks of process 500 may be performed by a mobile device 130. In some embodiments, process 500 is performed by a mobile device application (e.g., mobile device application 132) executing on the mobile device 130. Process 500 is described with respect to a mobile device 130, but is not limited to performance by such.

At block 510, the mobile device 130 establishes a wireless connection with a hazard detection device (e.g., hazard detection device 110). In some embodiments, the hazard detection device is a mobile device case having a molded body comprising a cavity within the molded body, the cavity sized to receive the mobile device 130 and securely hold the mobile device 130 when the mobile device 130 is fully inserted into the cavity. As an addition or alternative, the hazard detection device may be a mobile device attachment having a first clamp component and a second clamp component that are adjustable to receive and securely hold the mobile device 130 between a first contact surface and a second contact surface. As an addition or alternative, the hazard detection device may be a wearable device worn by a user of the mobile device 130.

At block 520, the mobile device 130 obtains mobile device sensor data from one or more sensors of the mobile device 130. The one or more sensors may include one or more of an accelerometer, a gyroscope, a GPS sensor, an ambient light sensor, a barometer, a camera, and/or any other sensor of the mobile device 130.

At block 530, the mobile device 130 obtains mobile device usage data describing current usage of the mobile device 130 by a user. The mobile device usage data may include one or more of data describing the usage of particular applications on the mobile device 130, data describing user interactions, such as tapping, scrolling, scrolling, swiping, panning, and/or other user interactions with the mobile device 130, and/or data describing one or more external devices connected to the mobile device 130.

At block 540, the mobile device 130 analyzes the mobile device sensor data and the mobile device usage data to determine a presence of a hazardous operating condition.

At block 550, in response to determining the presence of the hazardous operating condition, the mobile device 130 transmits an activation signal to the hazard detection device.

At block 560, the mobile device 130 receives remote sensing data from the hazard detection device collected by the hazard detection device in response to the activation signal. In some embodiments, the remote sensing data received from the hazard detection device includes LIDAR data. As an addition or alternative, the remote sensing data received from the hazard detection device may include radar data.

At block 570, the mobile device 130 processes the remote sensing data to identify a potential collision event. A potential collision event may be identified or detected based on the probability that an object in the environment will come within a certain distance of the user.

At block 580, in response to identifying the potential collision event, the mobile device 130 generates notification instructions that trigger an alert on the mobile device 130. In some embodiments, the mobile device 130 sends hazard analysis data associated with the mobile device 130 and the potential collision event to a server computer system (e.g., server computer system 146), receives analytical data generated by the server computer system based on a plurality of potential collision events associated with the mobile device 130, and presents the analytical data on a display of the mobile device 130. For example, the analytical data may describe potentially hazardous behavior by the user of the mobile device 130. As an addition or alternative, the mobile device 130 may send hazard analysis data associated with the mobile device 130 and the potential collision event to a server computer system, receive aggregate data generated by the server computer system based on a plurality of potential collision events associated with a plurality of mobile devices, and present the aggregate data on a display of the mobile device 130. In some embodiments, the aggregate data describes potentially hazardous conditions associated with a location of the mobile device 130.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. As an addition or alternative, the one or more special-purpose computing devices may include digital electronic devices such as one or more application-specific integrated circuits (ASICs) or field-programmable gate arrays (FPGAs) that are persistently programmed to perform the techniques. As an addition or alternative, the one or more special-purpose computing devices may include one or more general-purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, and/or any other device that incorporates hard-wired or program logic to implement the techniques.

Figure 6:
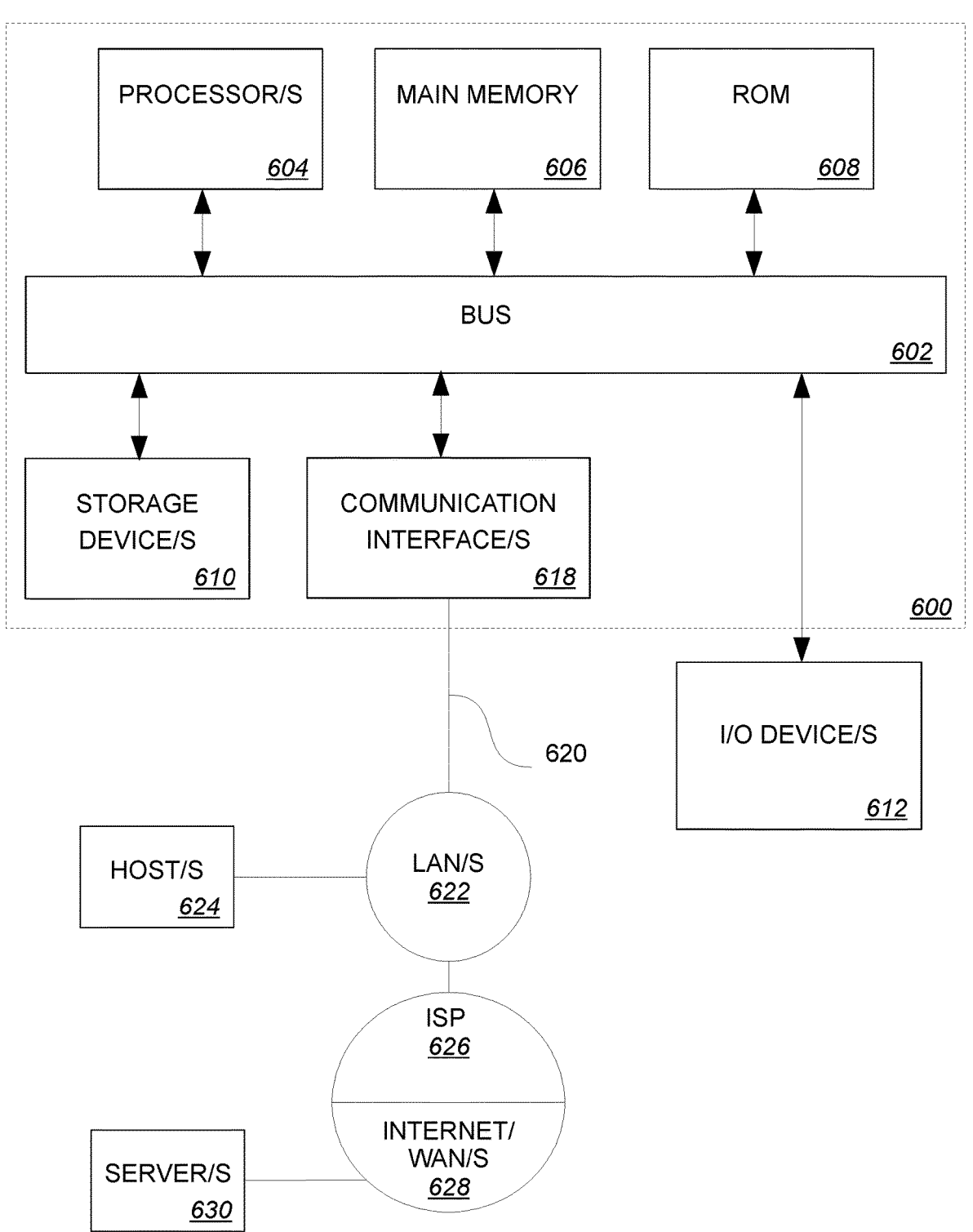
FIG. 6 illustrates a computer system upon which one or more embodiments may be implemented.

FIG. 6 illustrates a computer system upon which one or more embodiments may be implemented. The computer system 600 includes a bus 602 or other communication mechanism for communicating information, and one or more hardware processors 604 coupled with bus 602 for processing information, such as computer instructions and data. The hardware processor/s 604 may include one or more general-purpose microprocessors, graphical processing units (GPUs), coprocessors, central processing units (CPUs), and/or or other hardware processing units.

The computer system 600 also includes one or more units of main memory 606 coupled to the bus 602, such as random-access memory (RAM) or other dynamic storage, for storing information and instructions to be executed by the processor/s 604. Main memory 606 may also be used for storing temporary variables or other intermediate information during execution of instructions to be executed by the processor/s 604. Such instructions, when stored in non-transitory storage media accessible to the processor/s 604, turn the computer system 600 into a special-purpose machine that is customized to perform the operations specified in the instructions. In some embodiments, main memory 606 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

The computer system 600 may further include one or more units of read-only memory (ROM) 608 or other static storage coupled to the bus 602 for storing information and instructions for the processor/s 604 that are either always static or static in normal operation but reprogrammable. For example, the ROM 608 may store firmware for the computer system 600. The ROM 608 may include mask ROM (MROM) or other hard-wired ROM storing purely static information, programmable read-only memory (PROM), erasable programmable read-only memory (EPROM), electrically-erasable programmable read-only memory (EE-PROM), another hardware memory chip or cartridge, or any other read-only memory unit.

One or more storage devices 610, such as a magnetic disk or optical disk, is provided and coupled to the bus 602 for storing information and/or instructions. The storage device/s 610 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid-state drives, flash memory, optical disks, one or more forms of non-volatile random-access memory (NVRAM), and/or other non-volatile storage media.

The computer system 600 may be coupled via the bus 602 to one or more input/output (I/O) devices 612. For example, the I/O device/s 612 may include one or more displays for displaying information to a computer user, such as a cathode ray tube (CRT) display, a Liquid Crystal Display (LCD) display, a Light-Emitting Diode (LED) display, a projector, and/or any other type of display.

The I/O device/s 612 may also include one or more input devices, such as an alphanumeric keyboard and/or any other keypad device. The one or more input devices may also include one or more cursor control devices, such as a mouse, a trackball, a touch input device, or cursor direction keys for communicating direction information and command selections to the processor 604 and for controlling cursor movement on another I/O device (e.g., a display). A cursor control device typically has at degrees of freedom in two or more axes, (e.g., a first axis x, a second axis y, and optionally one or more additional axes z), that allows the device to specify positions in a plane. In some embodiments, the one or more I/O device/s 612 may include a device with combined I/O functionality, such as a touch-enabled display.

Other I/O device/s 612 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with the processor/s 604 over the bus 602.

The computer system 600 may implement the techniques described herein using customized hard-wired logic, one or more ASICs or FPGAs, firmware, and/or program logic which, in combination with the computer system causes or programs, causes computer system 600 to be a special-purpose machine. According to one embodiment, the techniques herein are performed by the computer system 600 in response to the processor/s 604 executing one or more sequences of one or more instructions contained in main memory 606. Such instructions may be read into main memory 606 from another storage medium, such as the one or more storage device/s 610. Execution of the sequences of instructions contained in main memory 606 causes the processor/s 604 to perform the process steps described herein. In alternative embodiments, hard-wired circuitry may be used in place of or in combination with software instructions.

The computer system 600 also includes one or more communication interfaces 618 coupled to the bus 602. The communication interface/s 618 provide two-way data communication over one or more physical or wireless network links 620 that are connected to a local network 622 and/or a wide area network (WAN), such as the Internet. For example, the communication interface/s 618 may include an integrated services digital network (ISDN) card, cable modem, satellite modem, or a modem to provide a data communication connection to a corresponding type of telephone line. Alternatively and/or in addition, the communication interface/s 618 may include one or more of: a local area network (LAN) device that provides a data communication connection to a compatible local network 622; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network; and other networking devices that establish a communication channel between the computer system 600 and one or more LANs 622 and/or WANs.

The network link/s 620 typically provides data communication through one or more networks to other data devices. For example, the network link/s 620 may provide a connection through one or more local area networks 622 (LANs) to one or more host computers 624 or to data equipment operated by an Internet Service Provider (ISP) 626. The ISP 626 provides connectivity to one or more wide area networks 628, such as the Internet. The LAN/s 622 and WAN/s 628 use electrical, electromagnetic, or optical signals that carry digital data streams. The signals through the various networks and the signals on the network link/s 620 and through the communication interface/s 618 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise the bus 602. Transmission media can also take the form of acoustic or light waves, such as those generated during radio-wave and infra-red data communications.

Various forms of media may be involved in carrying one or more sequences of one or more instructions to the processor 604 for execution. For example, the instructions may initially be carried on a magnetic disk or solid-state drive of a remote computer. The remote computer can load the instructions into its main memory 606 and send the instructions over a telecommunications line using a modem. A modem local to the computer system 600 can receive the data on the telephone line and use an infra-red transmitter to convert the data to an infra-red signal. An infra-red detector can receive the data carried in the infra-red signal and appropriate circuitry can place the data on the bus 602. The bus 602 carries the data to main memory 606, from which the processor 604 retrieves and executes the instructions. The instructions received by main memory 606 may optionally be stored on the storage device 610 either before or after execution by the processor 604.

The computer system 600 can send messages and receive data, including program code, through the network(s), the network link 620, and the communication interface/s 618. In the Internet example, one or more servers 630 may transmit signals corresponding to data or instructions requested for an application program executed by the computer system 600 through the Internet 628, ISP 626, local network 622 and a communication interface 618. The received signals may include instructions and/or information for execution and/or processing by the processor/s 604. The processor/s 604 may execute and/or process the instructions and/or information upon receiving the signals by accessing main memory 606, or at a later time by storing them and then accessing them from the storage device/s 610.

OTHER ASPECTS OF DISCLOSURE

The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments are described with reference to specific details that may vary from implementation to implementation. Nevertheless, it will be understood that various modifications may be made without departing from the spirit and scope of the invention. The examples set forth above are provided to those of ordinary skill in the art as a complete disclosure and description of how to make and use the embodiments, and are not intended to limit the scope of what the inventor/inventors regard as their invention. Modifications of the above-described modes for carrying out the methods and systems herein disclosed that are obvious to persons of skill in the art are intended to be within the scope of the present disclosure and the following claims. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A hazard detection device for use with a mobile device, the hazard detection device comprising:

a body configured to detachably couple with the mobile device;

a remote sensing system comprising one or more sensors disposed on an exterior surface of the body, the one or more sensors positioned such that the one or more sensors face away from a user of the mobile device when the body is coupled with the mobile device;

a wireless communication component comprising hardware for establishing a wireless communication channel with the mobile device;

a battery configured to power the remote sensing system and the wireless communication component; and a hardware control module configured to:

receive an activation signal from an application executing on the mobile device, the application configured to analyze mobile device sensor data and mobile device usage data describing current usage of the mobile device by the user to determine a presence of a hazardous operating condition, and transmit the activation signal in response to determining the presence of the hazardous operating condition;

activate the remote sensing system to collect remote sensing data from the one or more sensors of the remote sensing system in response to the activation signal; and transmit the remote sensing data to the mobile device.

2. The hazard detection device of claim 1:

wherein the remote sensing system comprises a solid-state Light Detection and Ranging (LIDAR) instrument; and wherein the one or more sensors comprises LIDAR camera of the solid-state LIDAR instrument.

3. The hazard detection device of claim 1:

wherein the remote sensing system comprises a radio direction and ranging (radar) instrument; and wherein the one or more sensors includes a radar sensor.

4. The hazard detection device of claim 1, wherein the remote sensing system comprises a combined LIDAR and radar chip comprising one or more integrated circuits that control a LIDAR instrument and a radar instrument.

5. The hazard detection device of claim 1, wherein the body comprises a molded body comprising a cavity within the molded body, the cavity sized to receive the mobile device and securely hold the mobile device when the mobile device is fully inserted into the cavity.

6. The hazard detection device of claim 5, wherein the one or more sensors are disposed near a top edge of the molded body and facing away from the user of the mobile device when the mobile device is fully inserted into the cavity.

7. The hazard detection device of claim 1, further comprising:

a first clamp component coupled with and extending from the body in a first direction, the first clamp component comprising a first contact surface;

a second clamp component coupled with and extending from the body in a second direction, the second clamp component comprising a second contact surface that faces the first contact surface; and wherein the first clamp component and the second clamp component are adjustable to receive and securely hold the mobile device between the first contact surface and the second contact surface.

8. The hazard detection device of claim 1, wherein the one or more sensors of the remote sensing system are movably coupled with the body to adjust a position of the one or more sensors relative to the mobile device when the mobile device is coupled with the body.

9. The hazard detection device of claim 8, wherein the one or more sensors are disposed on a movable panel that is movably coupled with the body to adjust the position of the one or more sensors.

10. The hazard detection device of claim 9, further comprising a liquid cooling system configured to perform thermal management for at least one of the battery and the remote sensing system when the remote sensing system is activated.

11. A computer-implemented method for hazard detection on a mobile device comprising:

establishing a wireless connection with a hazard detection device;

obtaining mobile device sensor data from one or more sensors of the mobile device;

obtaining mobile device usage data describing current usage of the mobile device by a user of the mobile device;

analyzing the mobile device sensor data and the mobile device usage data to determine a presence of a hazardous operating condition;

in response to determining the presence of the hazardous operating condition, transmitting an activation signal to the hazard detection device;

receiving remote sensing data from the hazard detection device collected by the hazard detection device in response to the activation signal;

processing the remote sensing data to identify a potential collision event; and in response to identifying the potential collision event, generating notification instructions that trigger an alert on the mobile device.

12. The computer-implemented method of claim 11, wherein the remote sensing data received from the hazard detection device includes at least one of LIDAR data and radar data.

13. The computer-implemented method of claim 11, wherein the hazard detection device is a wearable device worn by the user of the mobile device.

14. The computer-implemented method of claim 11, wherein the hazard detection device comprises a molded body comprising a cavity within the molded body, the cavity sized to receive the mobile device and securely hold the mobile device when the mobile device is fully inserted into the cavity.

15. The computer-implemented method of claim 11, further comprising:

sending hazard analysis data associated with the mobile device and the potential collision event to a server computer system; and receiving analytical data generated by the server computer system based on a plurality of potential collision events associated with the mobile device;

present the analytical data on a display of the mobile device.

16. The computer-implemented method of claim 15, wherein the analytical data describes potentially hazardous behavior by the user of the mobile device.

17. The computer-implemented method of claim 11, further comprising:

sending hazard analysis data associated with the mobile device and the potential collision event to a server computer system; and receiving aggregate data generated by the server computer system based on a plurality of potential collision events associated with a plurality of mobile devices;

present the aggregate data on a display of the mobile device.

18. The computer-implemented method of claim 17, wherein the aggregate data describes potentially hazardous conditions associated with a location of the mobile device.

19. A hazard detection device for use with a mobile device, the hazard detection device comprising:

a body configured to detachably couple with the mobile device;

a remote sensing system comprising one or more sensors disposed on an exterior surface of the body, the one or more sensors positioned such that the one or more sensors face away from a user of the mobile device when the body is coupled with the mobile device, the one or more sensors movably coupled with the body to adjust a position of the one or more sensors relative to the mobile device when the mobile device is coupled with the body, the one or more sensors disposed on a movable panel that is movably coupled with the body to adjust the position of the one or more sensors;

a wireless communication component comprising hardware for establishing a wireless communication channel with the mobile device;

a battery configured to power the remote sensing system and the wireless communication component; and a hardware control module configured to:

receive an activation signal from the mobile device;

activate the remote sensing system to collect remote sensing data from the one or more sensors of the remote sensing system in response to the activation signal; and transmit the remote sensing data to the mobile device.

* * * * *